(12) United States Patent
Nguyen

(10) Patent No.: US 11,019,469 B2
(45) Date of Patent: May 25, 2021

(54) GEOGRAPHIC USER INTERACTION SYSTEM WITH PROXIMITY

(71) Applicant: CLICK INC, Portland, OR (US)

(72) Inventor: Quan Nguyen, Portland, OR (US)

(73) Assignee: CLICK INC, Portland, OR (US)

( * ) Notice: Subject to any disclaimer, the term of this patent is extended or adjusted under 35 U.S.C. 154(b) by 0 days.

(21) Appl. No.: 16/272,712

(22) Filed: Feb. 11, 2019

(65) Prior Publication Data
US 2019/0253848 A1 Aug. 15, 2019

Related U.S. Application Data

(60) Provisional application No. 62/650,601, filed on Mar. 30, 2018, provisional application No. 62/630,524, filed on Feb. 14, 2018.

(51) Int. Cl.
| | |
|---|---|
| *H04W 24/00* | (2009.01) |
| *H04W 4/18* | (2009.01) |
| *G06Q 50/00* | (2012.01) |
| *H04W 4/021* | (2018.01) |

(52) U.S. Cl.
CPC ............ *H04W 4/185* (2013.01); *G06Q 50/01* (2013.01); *H04W 4/021* (2013.01)

(58) Field of Classification Search
CPC ......... H04W 4/02; H04W 4/14; H04W 48/04; H04W 64/00
USPC ........................... 455/456.1–456.6, 457, 466
See application file for complete search history.

(56) References Cited

U.S. PATENT DOCUMENTS

| | | | | |
|---|---|---|---|---|
| 2011/0010674 A1* | 1/2011 | Knize | ................... | H04W 4/029 715/849 |
| 2013/0290095 A1* | 10/2013 | Crinon | ............... | G06Q 30/0246 705/14.45 |
| 2015/0172786 A1* | 6/2015 | Lee | .................... | H04N 21/2187 725/1 |

(Continued)

OTHER PUBLICATIONS

Indoor Atlas, "Build seamless location-based experiences today," printed Jun. 11, 2018, found at http://www.indooratlas.com/.

(Continued)

*Primary Examiner* — Matthew W Genack
(74) *Attorney, Agent, or Firm* — Miller Nash Graham & Dunn LLP

(57) ABSTRACT

A method of defining a set of parameters for a user computing device in a geographic location system includes receiving, through a user interface on the user device, a signal activating a share profile, wherein a share profile comprises a pre-defined set of parameters for operation of the system with regard to the user device, presenting, on the user interface, options to allow the user to define the share profile, wherein the options include location sharing, profile sharing, and activation, and receiving, from the user device, a set of parameters, wherein the set of parameters define how the geographic location system interacts with the user device while that share profile is active. A method of employing geotags in a geographic location system including monitoring positions of users in the geographic location system, determining when a user is near at least one geotag, determining if the at least one geotag can be sent to a device of the user, and sending a notification to the device of the user when the geotag can be sent to the user.

5 Claims, 13 Drawing Sheets

(56) References Cited

U.S. PATENT DOCUMENTS

| | | | |
|---|---|---|---|
| 2017/0032402 A1* | 2/2017 | Patsiokas | G06Q 30/0266 |
| 2018/0075493 A1* | 3/2018 | Agarwal | G06Q 30/0275 |
| 2019/0007377 A1* | 1/2019 | Bender | H04L 12/1895 |
| 2019/0149954 A1* | 5/2019 | Erickson | H04W 4/029 |
| | | | 455/456.1 |

OTHER PUBLICATIONS

Google Maps Platform, printed Jun. 11, 2018, https://cloud.google.com/maps-platform/.

* cited by examiner

GEOGRAPHIC USER INTERACTION SYSTEM WITH PROXIMITY

RELATED APPLICATIONS

This application is a continuation of, and claims priority to, U.S. Provisional Patent Application Nos. 62/630,524 filed Feb. 14, 2018, and 62/650,601 filed Mar. 30, 2018, incorporated by reference here in their entirety.

BACKGROUND

Social media applications (apps) such as Facebook®, and LinkedIn®, allow users to post information and share with selected other users. Users may 'check-in' at locations, and try to sort out who is near them by the other users' posts, but have no means to see where the other users are relative to them on a map. Some social media connection apps allow users to communicate with people who are near them, but can only surmise that the person is near because the app connects only users who are within a predetermined range.

For users who are trying to connect with other users, and to see what other users are around them, the ability to use a map that shows that information would be invaluable. Similarly, it would be convenient for users to selectively remove themselves from other users' views, by blocking them, or becoming anonymous or invisible.

DETAILED DESCRIPTION OF THE EMBODIMENTS

The following discussion is not intended to limit application of the embodiments of the invention, but is merely provided to aid understanding. A user attends a large conference that involves tens, if not hundreds, of companies and hundreds, if not thousands, of people. In addition to attending meetings at the conferences, several of these companies and individuals may use this opportunity to meet and do business, as well as connect with people on a more ad hoc basis.

Using the embodiments here, a user can access a map of the venue that shows other users, their profiles, and their position in the venue. The user can not only go to another user's location; the user can view the person's profile and send a message. The user can also block other users from seeing them, or become anonymous so other users can see the location indicator but do not see the person's information.

Figure 1:
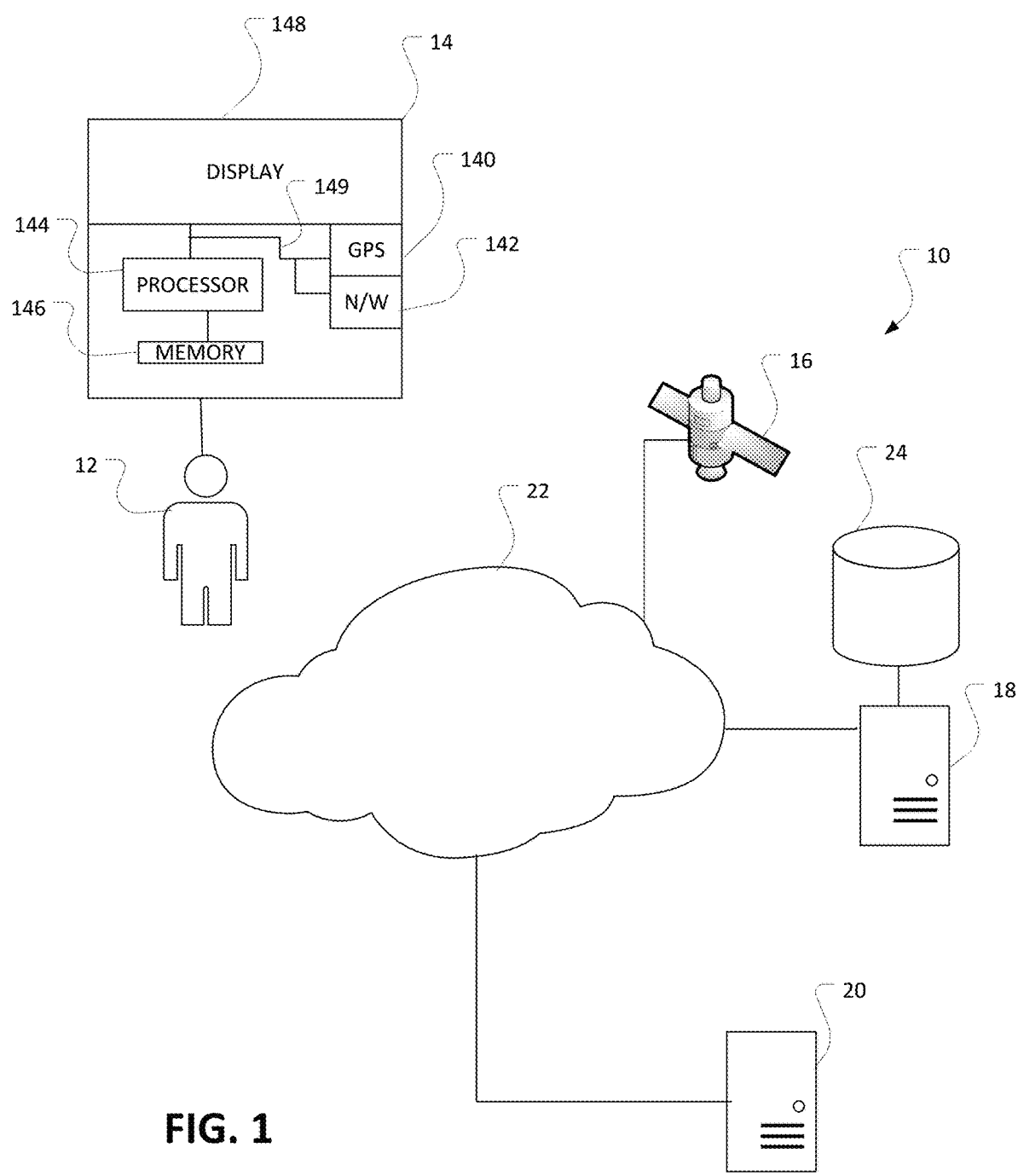
FIG. 1 shows an embodiment of a system having users identified by mobile devices on a map.

FIG. 1 shows an embodiment of a system 10 for locating users within a proximity of another user in a location. User 12 has a portable electronic computing device 14 such as a smart phone, tablet, laptop, or notebook computer. The computing device 14 may include one or more processors 144 that may be configured to communicate with and are operatively coupled to some peripheral subsystems via bus subsystem 149. These peripheral subsystems may include a storage subsystem/memory 146, one or more user input devices, in this embodiment a touch screen as part of the display 148, which also provides a user output interface, a network interface, also referred to as an adapter 142, and a Global Positioning System transmitter/receiver 140.

The bus subsystem 149 may provide a mechanism for enabling the various components and subsystems of computing device 14 to communicate with each other. Although FIG. 1 shows bus subsystem 149 as a single bus, alternative embodiments of the bus subsystem may utilize multiple busses.

The network interface 142 may provide an interface to other device systems and networks. The network interface 142 may serve as an interface for receiving data from and transmitting data to other systems from the computing device 14. The network interface 142 may include a wireless interface that allows the device 14 to communicate across wireless networks through a wireless access point, and may also include a cellular connection to allow the device to communicate through a cellular network. The network interface will allow the computing device 14 to communicate with one or more servers such as 18 and 20, and system data storage 24.

The device data store/memory 146 may include one or more separate memory devices. It may provide a computer-readable storage medium for storing the basic programming and data constructs that may provide the functionality of at least one embodiment of the disclosure here. The data store 146 may store the applications, which include programs, code modules, and instructions, that, when executed by one or more processors, may provide the functionality of one or more embodiments of the present disclosure. The data store 146 may comprise a memory and a file/disk storage subsystem. In addition, the computing device 14 may store data on another computer such as server 18 accessible through the network 22 via the network interface 142.

The device may also include separate control buttons, or may have integrated control buttons into the display if the display consists of a touch screen. The device in this embodiment has a touch screen and possibly one or more buttons, not shown, on the periphery of the touch screen/display 148. Alternative user input devices may include buttons, a keyboard, pointing devices such as a mouse, trackball, touch pad, etc. In general, the use of the term 'input device' is intended to encompass all possible types of devices and mechanisms for inputting information into the device 14.

User output devices, in this embodiment the display/touch screen 148, may include all display subsystems, audio output devices, etc. The output device may present user interfaces to facilitate user interaction with applications performing processes described here and variations.

The discussion here refers to 'servers' or 'server computing devices.' In general, the server referred to here is a server computing device with a processor and a memory that operates on the user information and provides information back to the users relating to other users in the community of users that subscribe to the same service. Typically, there will be an application server computing device and a global positioning service server that will communicate with the user device or the server. Many of the functions described here may be performed by the application server, the user device, the GPS server. No limitation of any function being performed by one of the devices is intended nor should it be implied.

In the environment of the system 10 the computing device 14 may be a client device. The network may consist of any appropriate network, including an intranet, the Internet, a cellular network, a local area network, a satellite network, or any other such network and/or combination of these. Components used for such a system can depend at least in part upon the type of network and/or environment selected. Protocols and components for communicating via such a network are well known and will not be discussed here in detail. Wired or wireless connections, or combinations of these, may enable communication over the network. In the embodiments here, the network includes the Internet and/or cellular communications. The application server 18 receives the requests and serves information in response to those requests via the network 22.

The application server 18 in combination with data store 24, or by itself, may consist of multiple servicers, layers or other elements, processors, or components, which may be chained, clustered, or otherwise configured, performs the tasks such as interacting with the client computing device and the data store 24. In some embodiments, some or all of the data store 24 may be housed in or integrated with the application servicer 18. Servers, as used here, may be implemented in various ways, such as hardware devices or virtual computer systems. Server may refer to a programming module executed on a computing system. The term 'data store' refers to any device or combination of devices capable of storing, accessing, and retrieving data. This may include any combination and number of data servers, databases, data storages devices and media, in any standard, distributed, or clustered environment.

The application server 18 may include any appropriate hardware, software, and firmware for integrating with the data store as needed to execute aspects of one or more applications for the client device, handling some or all the data access and logic for an application. The application server may provide access control services in cooperation with the data store and is able to generate content including, but not limited to, text, graphics, audio, video and/or other content usable to be provided to the user, which may be served to the user by the web server in the form of Hyper-Text Markup Language ("HTML"), Extensible Markup Language ("XML"), JavaScript, Cascading Style Sheets ("CSS"), or another appropriate client-side structured language.

Content transferred to a client device such as 14 may be processed by the client device to provide the content in one or more forms including, but not limited to, forms that are perceptible to the user audibly, visually and/or through other senses including touch, taste, and/or smell. The handling of all requests and responses, as well as the delivery of content between the client device 14 and the application server 18, can be handled by the web server using PHP: Hypertext Preprocessor ("PHP"), Python, Ruby, Perl, Java, HTML, XML, or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 24 can include several separate data tables, databases, data documents, dynamic data storage schemes and/or other data storage mechanisms and media for storing data relating to an aspect of the present disclosure. For example, the data store illustrated may include mechanisms for storing temporary data and general data storage. The data store also is shown to include a mechanism for storing alert data, which can be used to generate one or more alerts as described above. It should be understood that there can be many other aspects that may need to be stored in the data store, such as page image information and access rights information, which can be stored in any of the above listed mechanisms as appropriate or in additional mechanisms in the data store 24. The data store 24 is operable, through logic associated therewith, to receive instructions from the application server 18 and obtain, update, or otherwise process data in response thereto. The application server 18 may provide static, dynamic or a combination of static and dynamic data in response to the received instructions. Dynamic data, such as data used in web logs (blogs), data streams, and other such applications may be generated by server-side structured languages as described herein or may be provided by a content management system ("CMS") operating on, or under the control of, the application server.

Each server typically will include an operating system that provides executable program instructions for the general administration and operation of that server and typically will include a computer-readable storage medium, such as a hard disk, random access memory, read only memory, etc., storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure here.

The environment can include a variety of data stores and other memory and storage media as discussed above. These can reside in a variety of locations, such as on a storage medium local to (and/or resident in) one or more of the computers or remote from any or all the computers across the network. In a set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer, or speaker). Such a system may also include one or more storage devices, such as disk drives, optical storage devices and solid-state storage devices such as random-access memory ("RAM") or read-only memory ("ROM"), as well as removable media devices, memory cards, flash cards, etc.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 10 in FIG. 1 should be taken as being illustrative in nature and not limiting to the scope of the disclosure.

When the user activates, or launches, program code associated with the application discussed in these embodiments, the program code coordinates the device's location devices such as the GPS, Wi-Fi, Bluetooth, and a third-party Indoor Location API to determine the current location of the device and the user, which is transmitted to one or more application servers 18. During the location coordination process, the program code interacts with the device's GPS component to acquire the GPS location from one or more GPS satellites such as 16 and use it to determine the best relative location of the device before sending it to the application server. An application server is the server that executes the code and stores the data associated with the location application under discussion here. The application server 18, upon receiving notification that a user has signed in or become active in the system, uses the location coordinates, such as latitude and longitude, of the user to locate other users who are within the proximity set by the app user.

The system locates a first user in a community of users, such as subscribed users to a service. When a user activates the application or program code on a user device, it sends a signal to a server computing device. The server computing device contains user data that identifies the first user and the user-defined proximity radius. The system retrieves the position of the first user from the user device directly or from a global positioning system server. The server also includes locale information. Local information is information about the area around the user, such as a building or map. This will more than likely involve accessing a location server computing device to retrieve geographic information relating to the locale including a map either at that point or having been previously accessed. The system then determines other users in the community of users that have positions within the user-defined proximity. This information is then displayed on a user interface on the user device of the first user, the other users superimposed on a map of the locale.

Locating other users here means that the system performs a search in the system using an algorithm to find other active users, map users, in a region and calculate the distance between these users and the app user using their location coordinates. The system then checks against the privacy settings of all the users in the proximity to make sure they want to be exposed in that proximity before sending them to the app user. The system also checks the app user's filters to ensure that only users that match the app users' filters criteria will be sent to the app user. When the app user receives location coordinates of the map users and their information from the server, the program code then overlays those coordinates and their associated information on layout.

A layout is more than just a map. For example, if one uses an application that locates users, such as Waze® or Google Maps®, the application shows the location of a user in a city grid. Even if the user were in a building, the location is shown with streets and geographical features such as rivers, mountains, etc. The application here identifies the user's location, and then associates that location with a building, a venue, or the streets mentioned above, all of which will be referred to as a venue, with the layout of the venue drawn as background to the user. For example, the user may be in an exhibition hall that has fixed elements, such as restaurants or coffee shops around the perimeter. The layout would include those fixed elements, allowing people to see the user's location relative to those elements. When users are trying to meet up in a large, crowded venue, the layout becomes invaluable.

The information for the layout may come from many sources. The application here could contain a library of venues and their associated layouts, keyed to GPS coordinates of the elements of the layout. The application may access another application server such as 20 for the layouts that has an application programming interface that provides the building layouts and notifies the application when a user enters a venue that has a provided layout.

One should note that except for the GPS signals used by the application server, all information transmitted and received goes through the network 22 and the application server, no exposure of any phone numbers or email addresses occurs when users communicate through the application. None of this information used to identify users has any private elements other than what the user chooses to expose.

Figure 2:
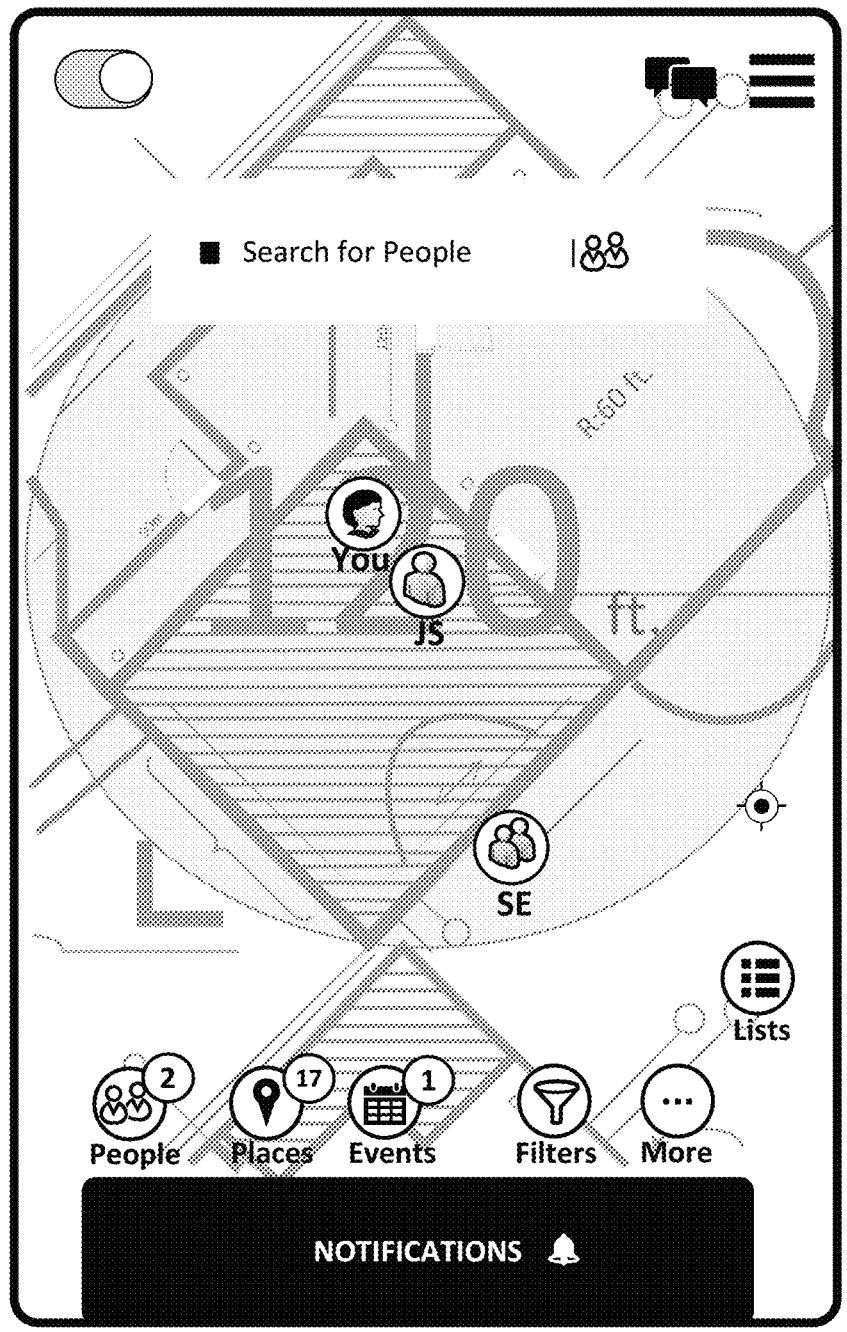
FIG. 2 shows an embodiment of a map displaying other users.

FIG. 2 shows an example of a map where a user ("You") is surrounded by other users using the application. The grey lines behind the user give the outline of the building or venue in which the user currently stands or sits. The vertical lines indicate the streets. The user can see that one identified user, JS, is nearby and another user, SE is in the proximity of the user. The user can use the application to contact the other users nearby with a quick contact referred to here as a 'connect request.'

Figure 3:
FIG. 3 shows an embodiment of a map display more detailed information about another user

In making contact, all the contacts will be through the application. The user's phone number, email, etc. will not be exposed by the contact. One of the many advantages of this application lies in allowing the users to have control over many different aspects of their privacy. The only information exposed to other users comes from whatever that user selects by a user profile. FIG. 3 shows an example of a user profile for the nearby user, John Smith.

In the user's profile shown in FIG. 3, one can see the user's name, age, interests, etc. For business users, one could include the company name, position, etc. The bottom of the screen shows that when the user selects the individual to see that user's profile, it occurs under networking. At the bottom of the profile window, there are choices for sending a connection request, shown as the sideways semicolon, sending a message, or viewing more details of the user's profile. The viewing user can also close the window by clicking outside of the profile window. This information is stored and associated with the user in the storage 22 from FIG. 1.

Figure 4:
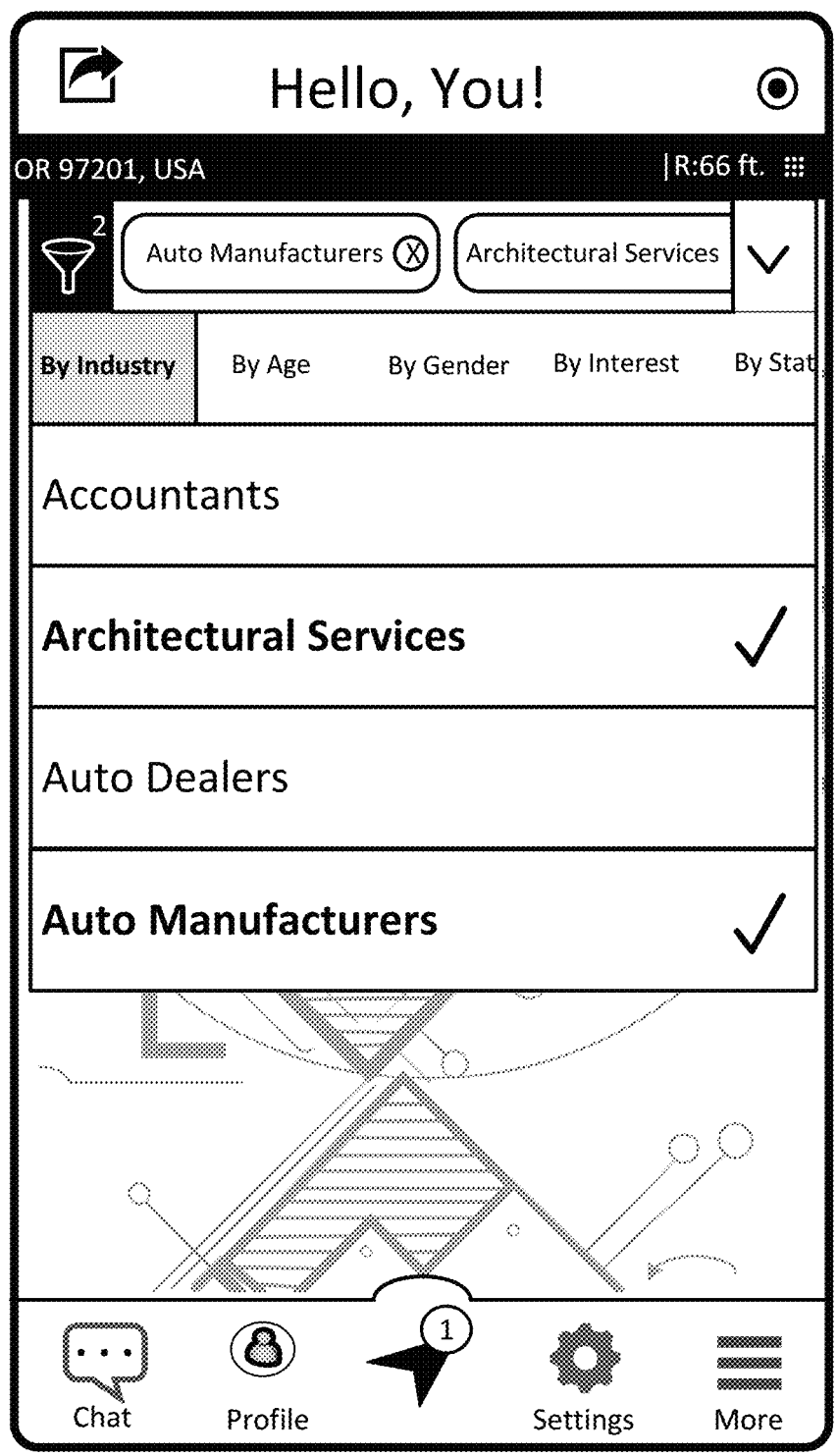
FIG. 4 shows an embodiment of a map filter.

While FIGS. 1 and 2 show a limited number of users, but one could imagine that the You user may have several hundred users in their proximity. The user may want to filter the users shown on the map. They could select gender, company, job, interest, etc. This will reduce the number of users viewable by the You user. FIG. 4 shows a use of filtering by types of business with which other users may be affiliated, such as Architectural Services and Auto Manufacturers.

Figure 5:
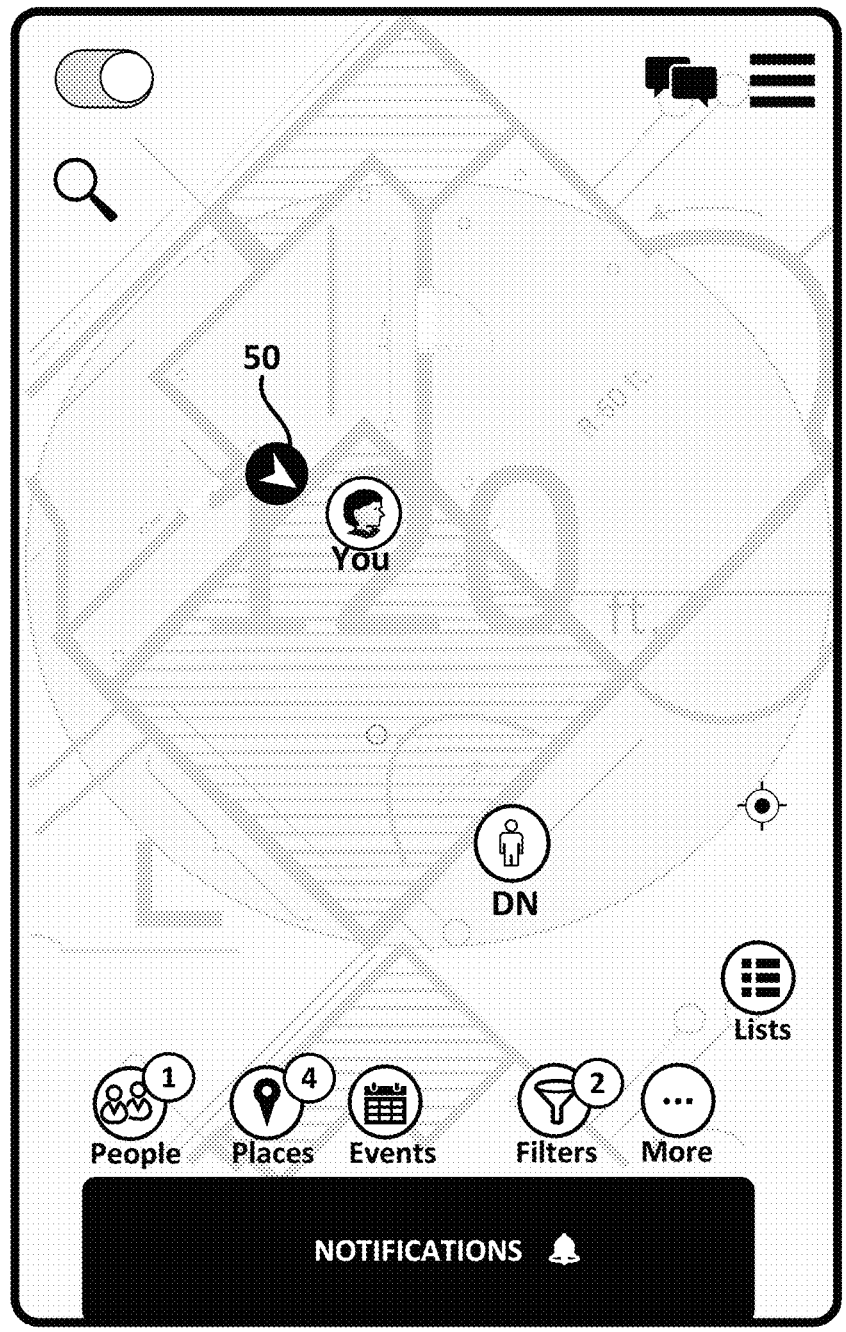
FIG. 5 shows an embodiment of an anonymous user on a map.

On the other side of the viewing, users can become anonymous, as shown in FIG. 5. Users may not want other users to see them on the map, or access the information that would otherwise be available to them. If someone launches the application on that person's portable device, typically the person would be prompted to log in. If that person logs in and becomes a user, that person's information will become available on the application for other users, unless the newly logged in user become anonymous or is hiding. However, a unique aspect of this system is that the user can choose to be anonymous with the user's identity hidden and still be able to use the system within the allowable capabilities. That person remains anonymous and can see how many other users in the proximity. Currently, anonymous users can see other users' information and send them messages, except for when other users filter them out. In FIG. 5, the anonymous user is shown as a navigation arrow 50. However, all their actions with other anonymous and registered users remain anonymous and are not retained in the system. Once the user turns off their anonymous mode, that user gets full functionality and access to all the other users' information, for users that have not chosen to block the first user.

Figure 6:
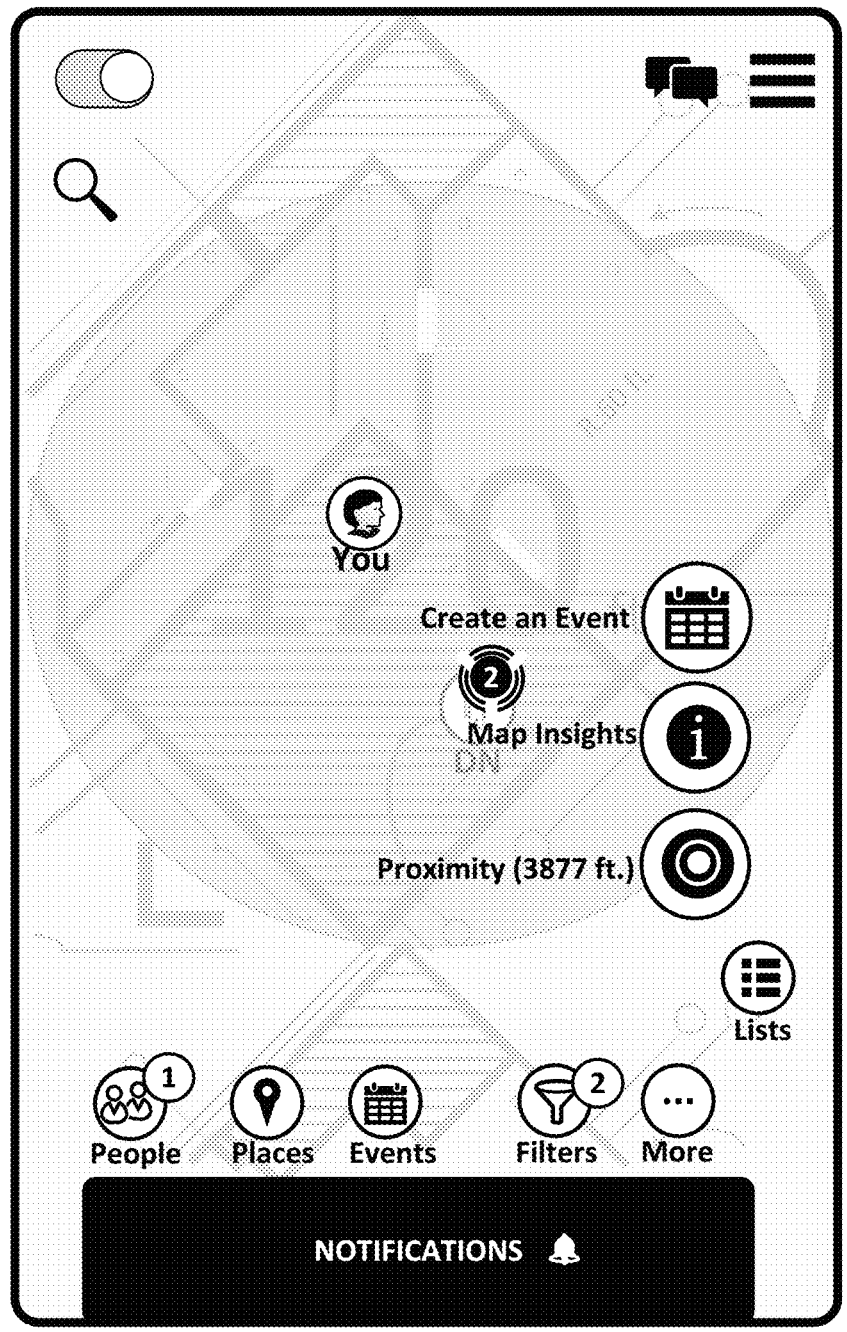
FIG. 6 shows an embodiment of a proximity radius for a user.
Figure 7:
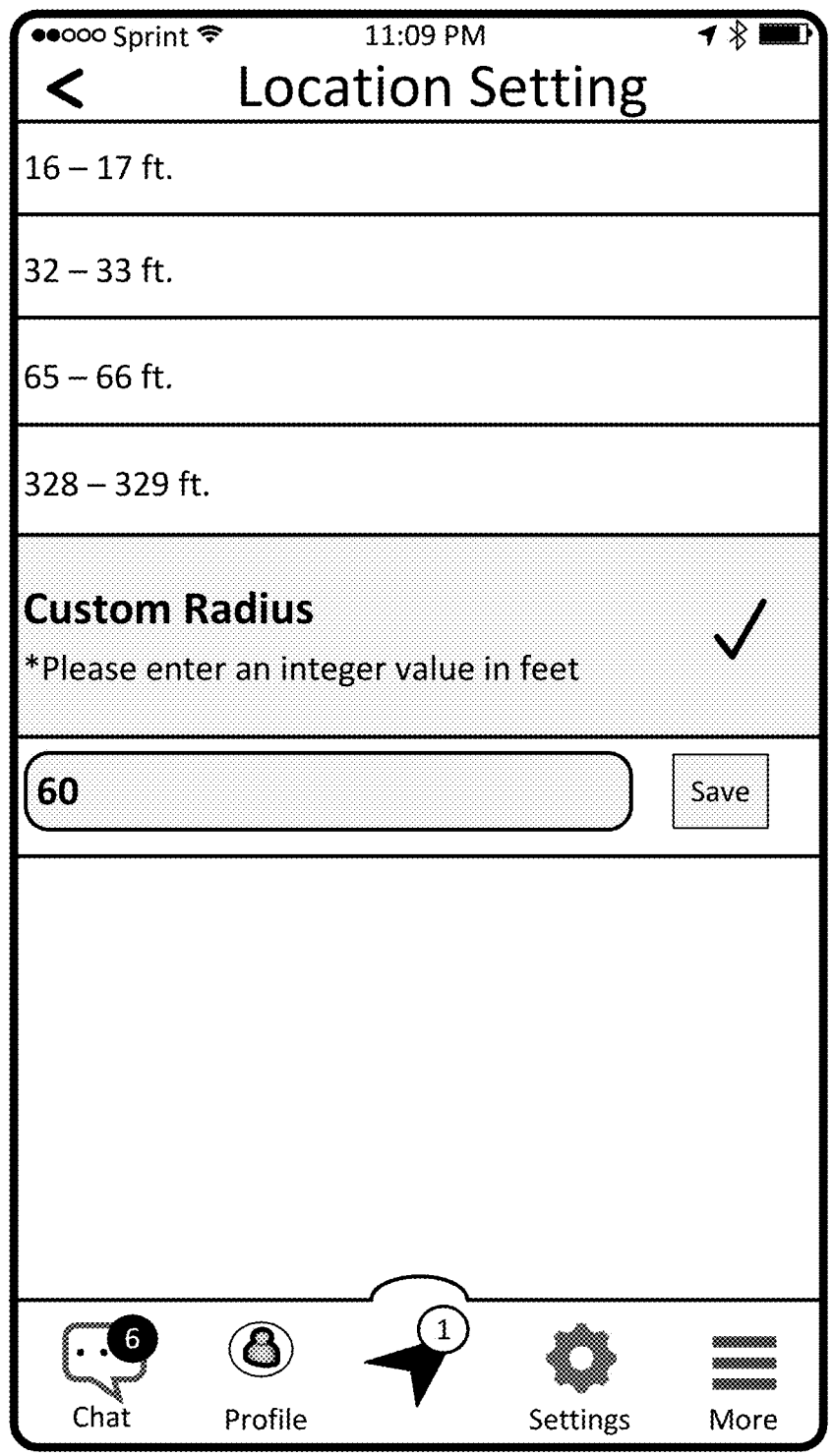
FIG. 7 shows an embodiment of a setting to adjust the proximity radius.
Figure 8:
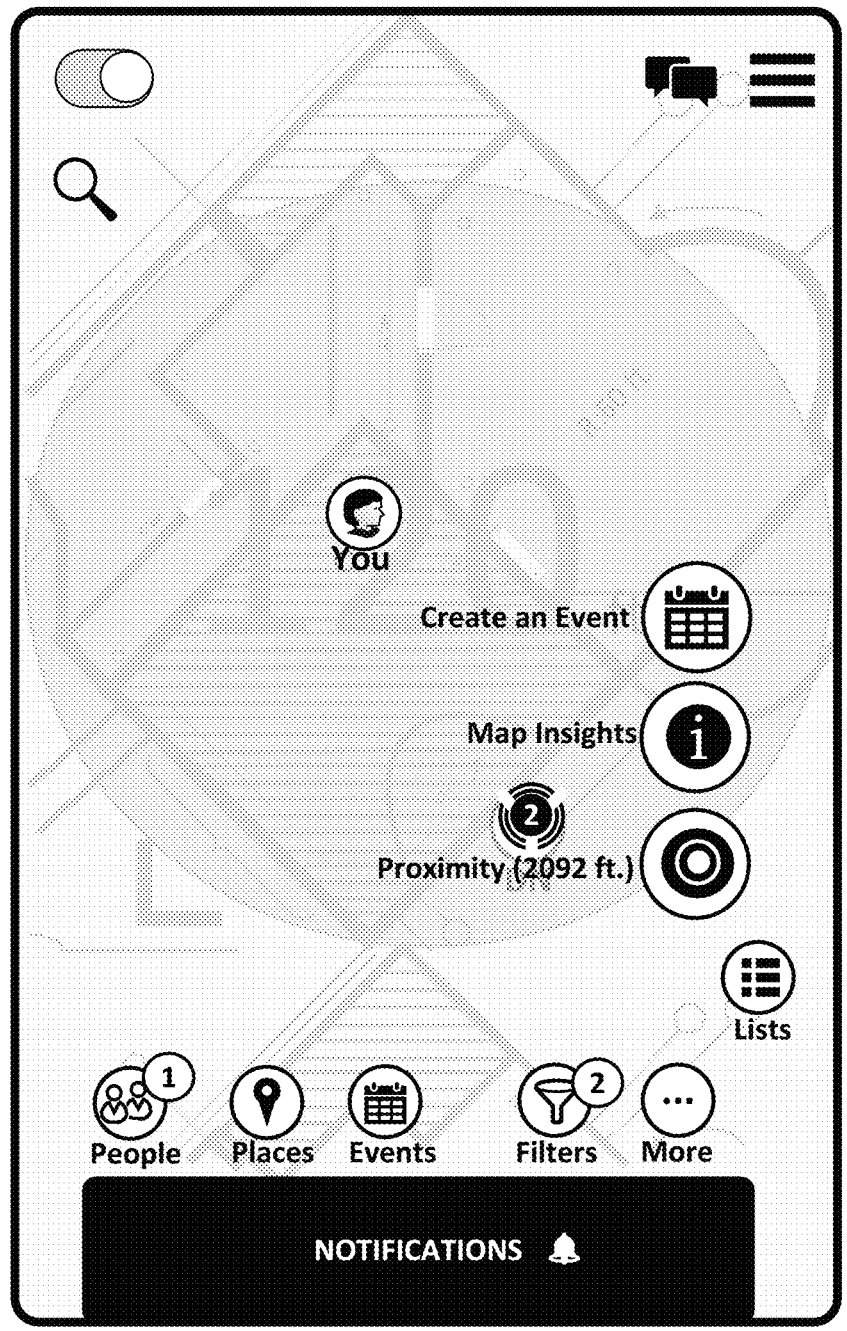
FIG. 8 shows an embodiment of a user having a different radius.

Another control element provided to the user involves the proximity radius. A user can select a proximity radius that controls a distance within which other users can be seen. The user can select how large of a radius to use. FIG. 6 shows the You user's location and the current radius. FIG. 7 shows the screen with the user's radius in the Tools menu. FIG. 8 shows the result of selecting Update Proximity Radius. While some preset radii are provided, the user can select a custom radius.

Figure 9:
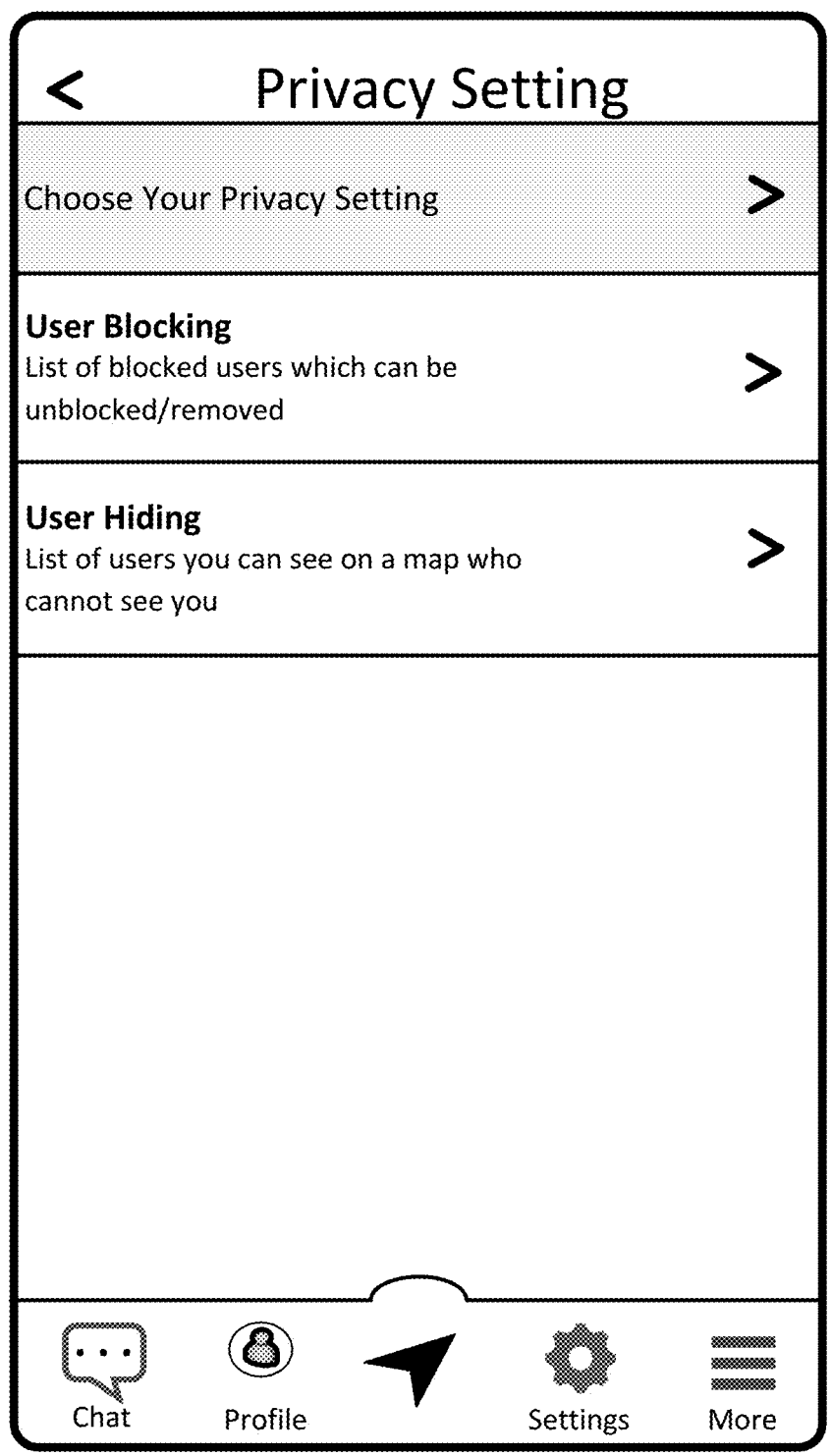
FIG. 9 shows a privacy setting for blocking and hiding.

In addition to the ability to filter users and define a proximity radius, the user can block other users from being able to see the user as shown in FIG. 9. The user can block and unblock people. When a person is blocked, it stops the blocking user from seeing that person and prevents the blocked user from being able to contact the blocking user. Another tool allows the user to hide from other users. Hiding prevents the other user from seeing the hidden user, but the hiding user can see the other users on the map.

Figure 10:
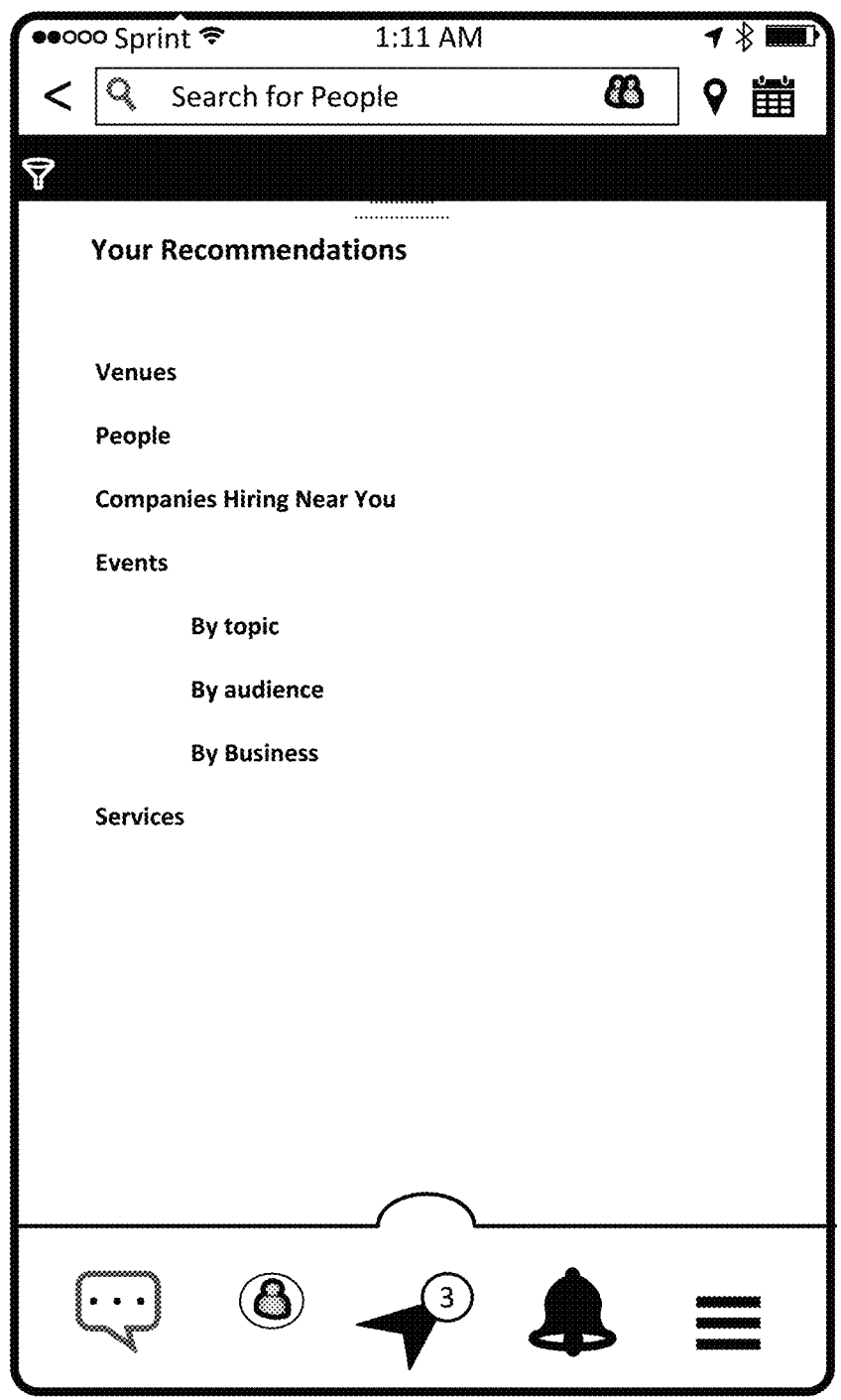
FIG. 10 shows a proximity-based set of recommendations.

The ability to provide proximity-based functions to users enables many different types of services. For example, the API could provide recommendations based upon the user's location or proximity. As shown in FIG. 10, these may include recommendations as to locations of likely jobs, venues to use for hosting events to get the best attendance, filtering other users in a particular proximity to recommend someone with whom the user may want to connect for a job, to discuss the venue, to network, etc.

The recommendations may include recommendations on purchase, such as the best deal on a product in the vicinity, the best fare for some mode of transportation, or provide lists of sales or other promotional events in the area. Regarding events, the system could provide the user with a list of events in the proximity based upon a particular criterion, for example, a particular topic, a defined group of people, an identified product, or a business. Recommendations or identification of businesses may allow for recommendations for services in the proximity, like find a nearby place that provides a solution for a current need.

As discussed above, the proximity is user-definable. The proximity definition may also include or take the form of a 'geofence,' which is an imaginary barrier set up at a defined location based upon a reference point, such as the user's location or the location of a particular venue. This customizable proximity setting allow the user to be isolated from activities normally shown in the system when the user is within or outside of a geofence they define.

Figure 11:
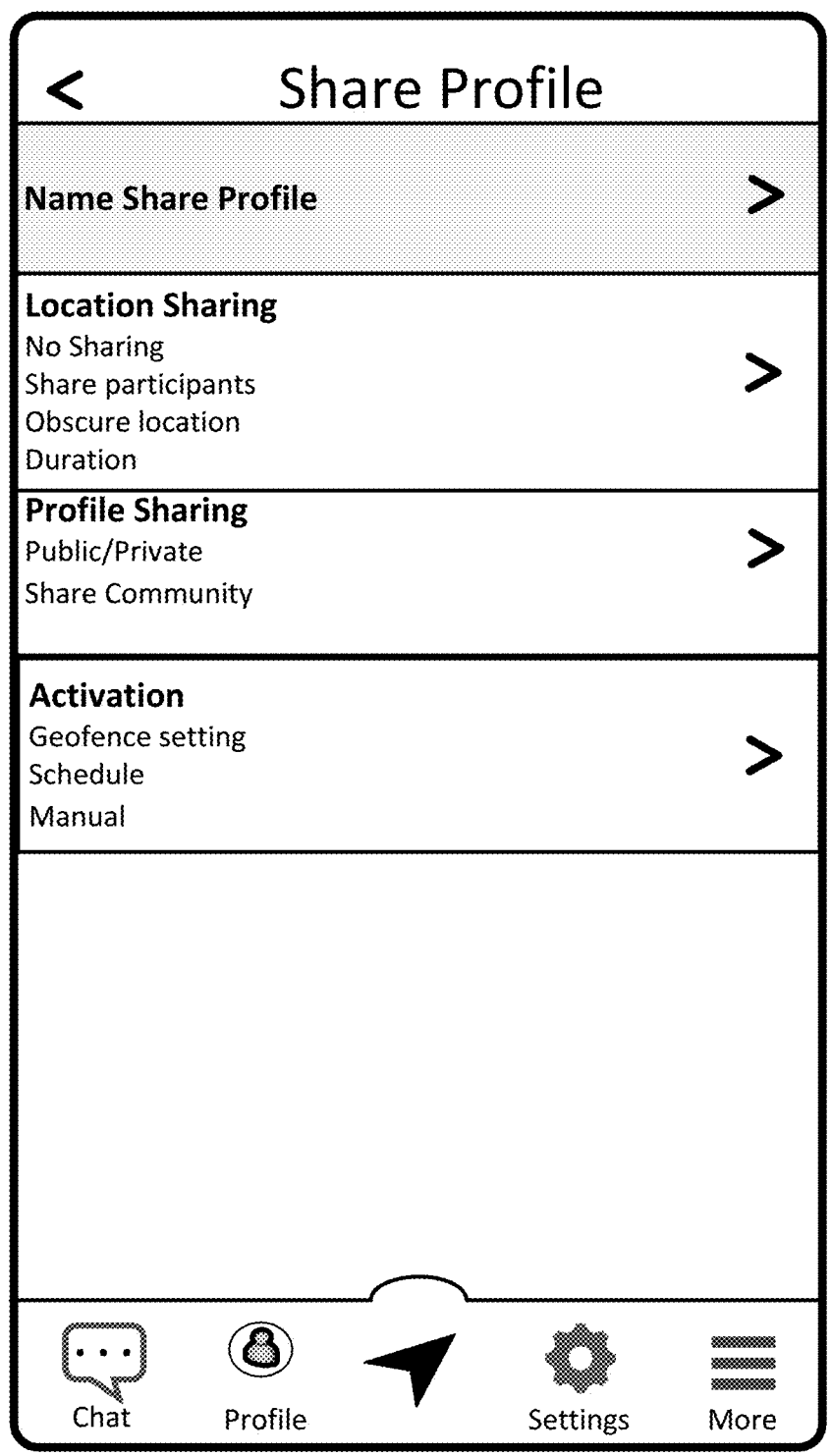
FIG. 11 shows an embodiment of a privacy setting including share profiles.

FIG. 11 shows a user interface similar to the one of FIG. 9, but with the added ability for the user to define a share profile that may include a geofence. A share profile is to provide a user the ability to create one or more profiles with information about how the user wants to control what information the user wants to see as well as what information the user wants to share with other at any given time. As shown in FIG. 11, the user can create many different share profiles and select them accordingly. An example may include "Daily Networking," or "ShowName" when attending a particular showcase or expo, etc. As part of the share profile, the user can designate location sharing, including no sharing, a list of people associated with that profile, whether or not to obscure the user's location, and a duration for the profile. These are just options, and are in no way intended to limit any options used.

In addition, the user can select how to share information on the user's profile, such as title, interests, activities, etc. The user can also select whether it should be public or private, and with which group the profile should be shared.

The user can also select how to activate the profile, such as entering a geofence, leaving a geofence, on a schedule, or whether the user wants to turn the profile manually or automatically.

Initially, the user uses his or her device to activate geofencing, a signal that the user's desires to use a geofence essentially that the user desires to limit the detectability of the user's device, and therefore the user. The user, through the user interface on the user's device, defines the geofence, a region surrounded by some limit that defines the area affected by the user's detectability. As shown in FIG. 11, the geofence is defined as a radius from the user's location. Other options would be for the user to be presented the map screen as in FIG. 2 or 5 and allow them to pick corners or other points to define the geofence.

When the user has set up a geofence, the system tracks the user's location relative to geofence. For example, if the user was standing at location A and defined a radius of 15 feet, the system may translate that into latitude and longitude measurements or other coordinates for the geofence from that location of the user. When the user moves, the points will remain fixed relative to the user's original location so when the user exits the area, the system can switch to either notifying the user or blocking notifications. As the user moves in and out of the geofence the designated profile may turn on and off automatically.

The proximity-base capabilities may also combine with scheduling or calendaring apps that define, prioritize and manage the scheduling of a customizable list of activities that happen at a particular location or during an event.

Figure 12:
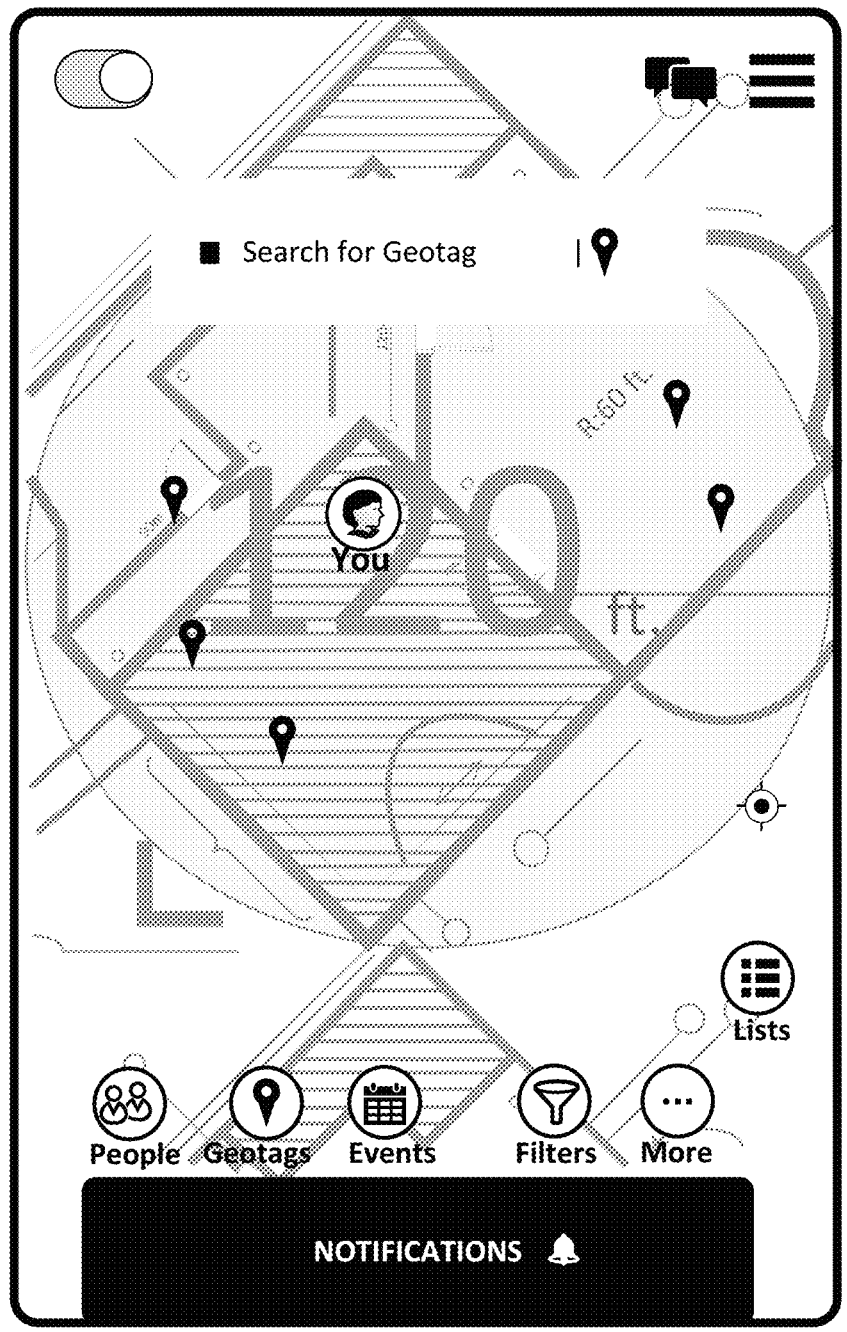
FIG. 12 shows an embodiment of a user interface with available geotags.

For example, the system could create and curate geolocation tags and make them available to users who might be interested in those tags. A geolocation tag, also referred to as a geotag, is a meta-data object that contains information describing a 'virtual object' associated with the geotag. Similar to the interface that displays other users, the user can see geotags, as can be seen in FIG. 12.

Figure 13:
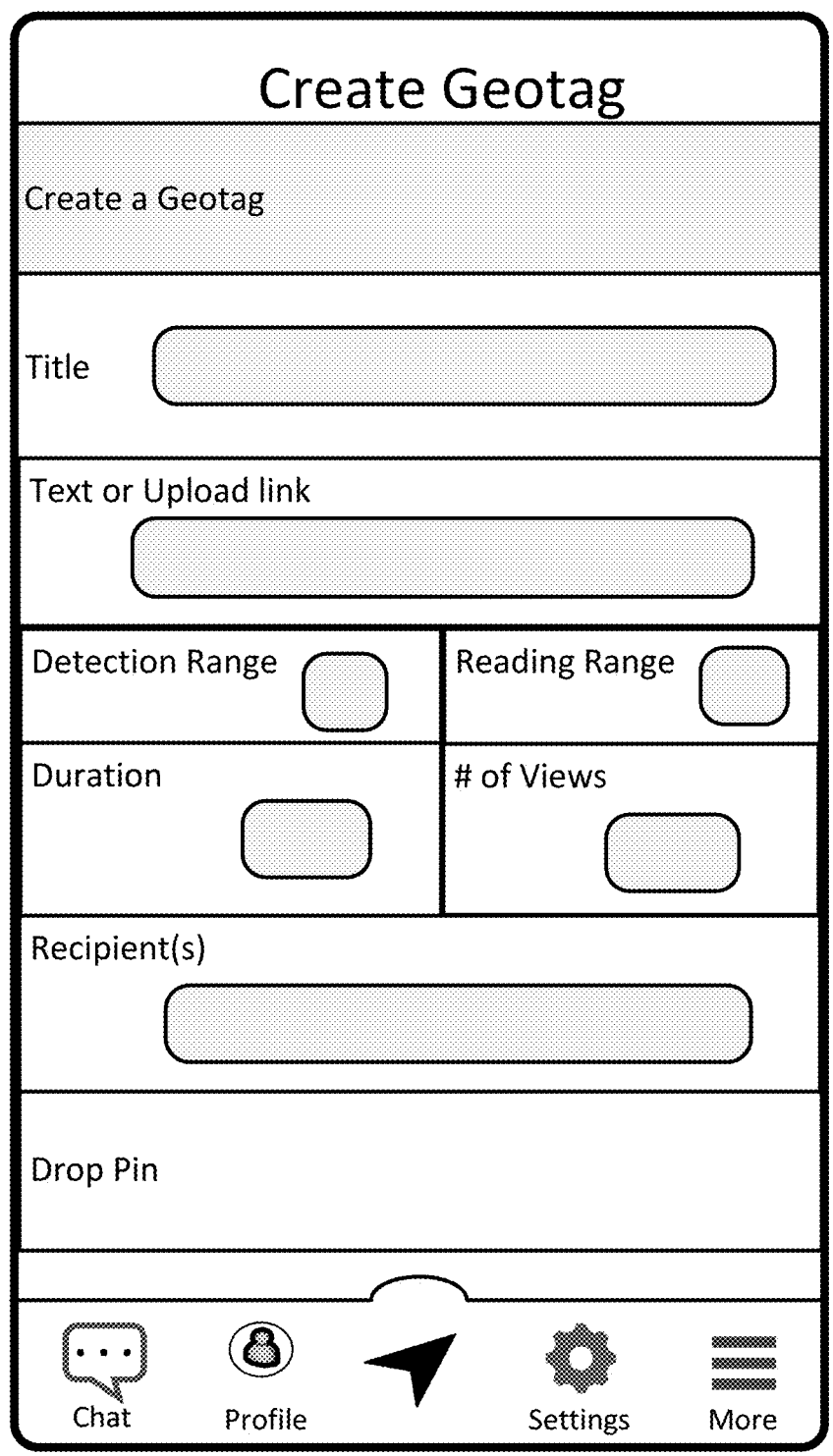
FIG. 13 shows an embodiment of a geotag creation user interface.

The virtual object includes but is not limited to the geolocation of the virtual object, the owner of the geotag, the intended audience of the geotag, etc. The attributes of the object may include the intended recipient, an alert, a detection range, reading range, creation range, duration, number of viewers, reader control, and creator control, among others. The user can make these selections when using a "Create Geotag" interface as shown in FIG. 13. While some of these options are shown in the user interface of FIG. 13, no limitation to any particular feature is intended nor should any be implied.

Users could employ geotags for many purposes, including business, personal, social/fun, etc. Examples include leaving a message for a friend or associate, taking pictures and leaving them for a friend, leaving messages for strangers with a particular interest, pre-purchasing something for another person, leaving an advertisement for an upcoming event, communicating with event attendees, communicating with customers, leaving professional work in a conspicuous place for others to view, leaving a digital business card, or leaving directions or instructions for others to get to particular place or to perform a particular task.

Many users are familiar with geotags being attached to media objects, such as photos, videos, advertisements, etc. In this use, the geotag would be associated with a location, such as a latitude and longitude or other coordinates, within the embodiments here. When a user's location coincides with the location that has been geotagged, the user may then see the geotag on that user's device, where the location may include a radius at which the geotag will become detectable. When the geotag is created, the location and the content of the tag are uploaded to the system servers, and as the system polls the area locating users it can locate users that are in the proximity of the geotag.

The geotag could have a simple message attached. The message may have functional aspects, such as an invitation to connect or join a group, and may include an image, video, document, etc. The message may include a user portal that gives access to media and messaging within a user created portal, exclusively within the system. The user may use it for personal marketing, with resumes, and examples of work, for professional use. Alternatively, or in addition, the user could use it for demonstration of their skills and interests in a particular hobby or pastime. The message could be used for business group or event marketing, including media associated with an event at a time and place, media associated with their business operations, media associated with a group of users, such as how to join, create content, etc. The messages may also be associated with travel, maps, tickets, directions, etc. The message may be a pre-purchase of an item, or a digital gift certificate.

In addition to the message, the geotags have the attributes previously mentioned. The intended recipient may include: the creator only; a specific connection, another user with whom the creator wants to connect; users who are a part of a specific group; users who have accepted an invitation to an event; users who have checked in at an event; users who have a specific skill, interest, or passion; users who have a specific work experience; and users have a specific school experience.

The alerts may include a map object, a push notification, an in-app message, and an email message.

The detection range means the range at which a user can detect the existence of the note. The range may be outside of a proximity that was specified by the user, or within that proximity. The proximity for geotags may differ from the proximity the user employs for contacting and visibility. The detection range may be set to be within some number of feet, or within touching distance. The reading range may have the same types of ranges. Similarly, the user may designate a creation range having the same types of ranges.

The duration of the tags is for how long the note exists, which may also be related to the number viewers, which is how many people can read the note. The duration may be forever, a number of years, dates or hours, or until the note is read a set number of times, which may include 1 time. The number of viewers may have no limit, or a set number of reads, which may include 1 reading.

The reader may have some limited control as well. The reader can chose to view all notes, or to exclude certain notes, based upon some parameter such as interests, experience, schools, etc. The user may exclude event notes, business notes, user notes, or to not view any notes at all.

The creator has control over the notes that the creator generated. This may include generating a new note, to edit a message attached to a previously created note, uploading media attached to the geotag, providing a link to a site that users who access the note can use to connect to a site, or to make the note visible or invisible. The creator can edit the detection range, reading range, alert, duration, number of viewers, etc. The creator can also update the note or delete the note.

A system user can use the system to create a tag with different types of content such as a text note, resume, links to Internet content such as videos, audio books, eCommerce products, and purchases. These can immediately convert to receipts or coupons for later redemption, etc.

When the user creates a tag, the system stores the current location of the user creating the tag or a specified location and attaches it to the geo-tag content. The system may also manage where users can create geo tags based upon the user's location and current status, such as the user's visibility, subscription level, etc. Regarding the subscriptions, the system may control the user's ability to create tags that live only a limited duration, or restricted locations, etc., based upon the user's subscription level.

When other system users approach within a proximity of a location where the tag was created, the system will notify the users in the proximity of relevant notes that might be of interest of them. Users can also query from a curated list of notes that the system prepares for them. The system may also develop systems that connect with businesses' ecommerce and financial systems to handle real-time transactions related to geo-tags.

To assist in understanding, and without any limitation to the embodiments, the discussion here provides some examples. A user could leave a note for another user at a coffee shop because the other user will come to the coffee shop at some point in the future. A user could leave a demonstration of the user's work for others at a shop in hopes that users that view the demonstration might hire the user to perform similar work for hire. A user could pre-purchase something for another user at a location so that the other user could use it while the other user is there, such as a gift certificate for a restaurant, etc. Governments could use the system to create warnings, updates, such as on road construction, etc.

The device of the user may or may not receive the geotag notification, depending also upon whether the user is receiving notifications, whether the user is a designated recipient of the geotag, or if a pre-determined number of viewers have seen the geotag.

The proximity-base capabilities may also combine with scheduling or calendaring apps that define, prioritize, and manage the scheduling of a customizable list of activities that happen at a location or during an event.

In this manner, the user can see the geographical positions of other users around them in a venue or region. The user has control of the radius in which he/she selects other users to be displayed on his/her map or to display him/her on their map, and can selective block or hide from other users, operate anonymously, or define boundaries within or without of which they user does not receive any information. The user can also choose to receive recommendations such as people to meet, things to buy, events to attend, etc.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the above discussion and the attached claims

What is claimed is:

1. A method of employing geotags in a geographic location system, comprising:
   monitoring positions of users in the geographic location system, the users have signed into the geographic location system through an application on a user device;
   determining when a user is near at least one geotag;
   determining if the at least one geotag can be sent to a device of the user, comprising
   determining a status of the user by checking that the user has selected to not block notifications as a user setting in the application on the user device in the geographic location system; and
   sending a notification to the device of the user when the geotag can be sent to the user.

2. The method as claimed in claim 1, wherein determining when the user is near at least one geotag comprises determining that the user has moved into a pre-defined proximity of at least one geotag.

3. The method as claimed in claim 1, wherein determining when the user is near at least one geotag comprises determining that the user has entered a venue having associated geotags.

4. The method as claimed in claim 1, wherein determining the status of the user comprises determining if the geotag is addressed to the user.

5. The method as claimed in claim 1, wherein determining the status of the user comprises determining that the user is a viewer that will view the geotag before a pre-determined number of viewers has been reached for the at least one geotag.

* * * * *